(12) United States Patent
Goncze

(10) Patent No.: US 8,500,035 B2
(45) Date of Patent: Aug. 6, 2013

(54) THERMOSTATIC MIXING VALVE

(75) Inventor: Zoltan Goncze, Sparks, NV (US)

(73) Assignee: Watts Water Technologies, Inc., North Andover, MA (US)

( * ) Notice: Subject to any disclaimer, the term of this patent is extended or adjusted under 35 U.S.C. 154(b) by 915 days.

(21) Appl. No.: 12/553,420

(22) Filed: Sep. 3, 2009

(65) Prior Publication Data

US 2010/0147963 A1    Jun. 17, 2010

Related U.S. Application Data

(60) Provisional application No. 61/192,051, filed on Sep. 15, 2008.

(51) Int. Cl.
*G05D 23/13* (2006.01)
*G05D 23/02* (2006.01)

(52) U.S. Cl.
USPC ............. 236/12.13; 236/12.11; 236/12.16

(58) Field of Classification Search
USPC ....... 236/12.13, 12.16, 93 R, 12.11; 137/457
See application file for complete search history.

(56) References Cited

U.S. PATENT DOCUMENTS

| 3,561,481 | A * | 2/1971 | Taplin | 137/625.4 |
| 6,820,816 | B1 * | 11/2004 | Reid | 236/12.13 |
| 2002/0011523 | A1 * | 1/2002 | Procter | 236/93 B |
| 2004/0011879 | A1 * | 1/2004 | Lorch | 236/12.1 |
| 2007/0194137 | A1 * | 8/2007 | Goncze | 236/12.11 |
| 2008/0191043 | A1 * | 8/2008 | Goncze | 236/12.11 |

* cited by examiner

*Primary Examiner* — Ljiljana Ciric
*Assistant Examiner* — Alexis Cox
(74) *Attorney, Agent, or Firm* — Edwards Wildman Palmer LLP; David J. Silvia; George N. Chaclas

(57) ABSTRACT

A thermostatic mixing valve including a cold water bypass passageway controlled by a pressure-operated check valve that opens upon a failure of a hot water supply to the valve for use with safety devices, such as eyewash and drench shower stations. The thermostatic mixing valve allows the continued delivery of cold water upon a failure of a hot water supply. The lack of hot water causes a cold water valve opening to be closed by a thermal motor, which retracts upon the lack of hot water, yet the bypass passageway is adapted to allow cold water to bypass the thermal motor-controlled cold water valve opening and be directed to the outlet of the valve.

14 Claims, 13 Drawing Sheets

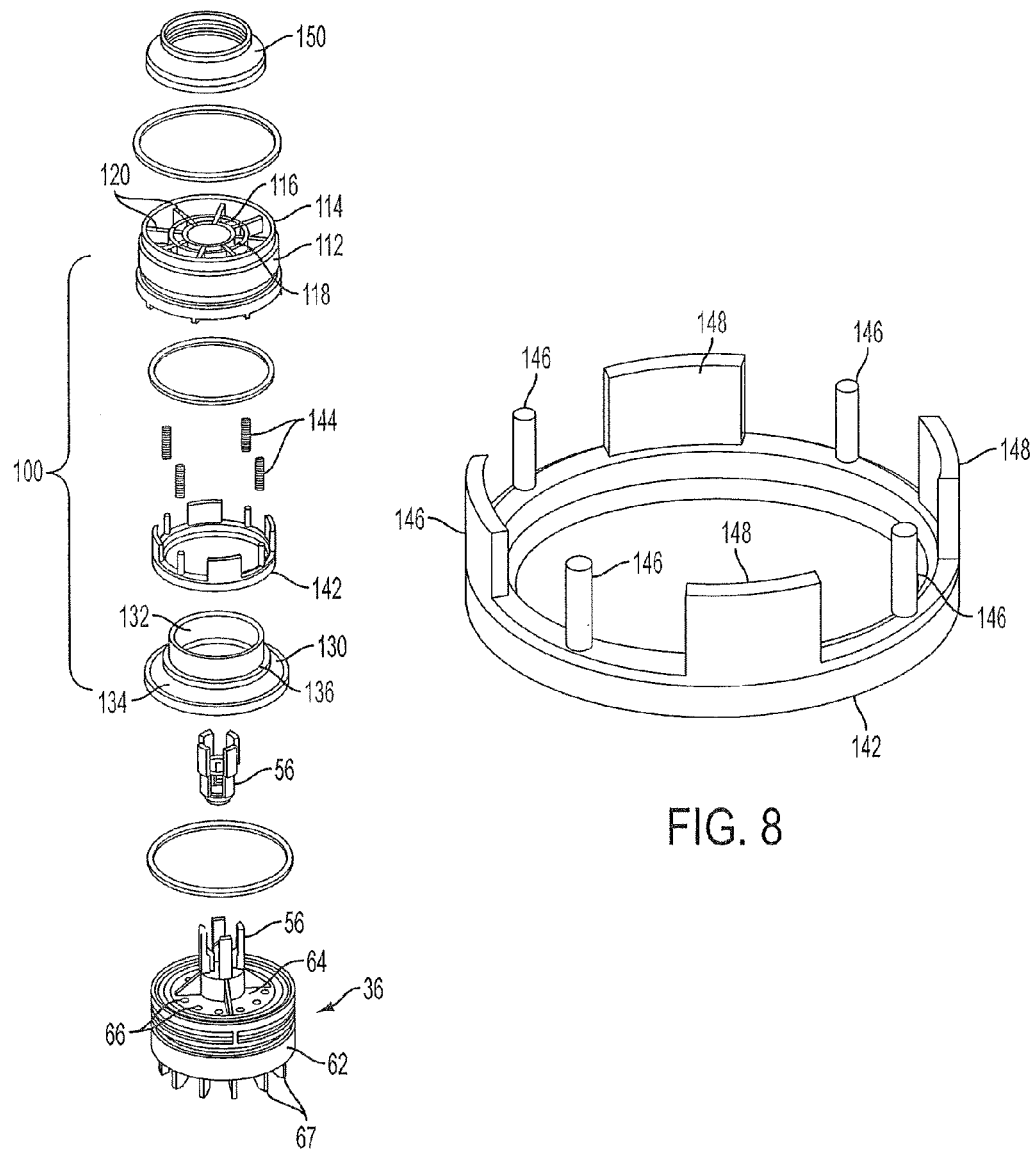

THERMOSTATIC MIXING VALVE

CROSS-REFERENCE TO RELATED APPLICATION

This application claims priority to U.S. Provisional Patent Application No. 61/192,051, filed Sep. 15, 2008, which is incorporated herein by reference.

TECHNICAL FIELD OF THE DISCLOSURE

The present disclosure generally relates to fluid control valves and, more particularly, to thermostatic mixing valves that mix hot and cold water supplies to produce tempered water. Even more particularly, the present disclosure relates to a thermostatic mixing valve adapted to allow a cold water bypass upon failure of the hot water supply.

BACKGROUND OF THE DISCLOSURE

Thermostatic mixing valves (TMVs) are well established and serve to provide a fluid (e.g., water) supply at a desired temperature. TMVs, also referred to as temperature-activated mixing valves, have a temperature responsive thermostat element, or thermal motor, operatively coupled to a valve member controlling fluid flows through hot and cold inlet ports of the valve. The mixed fluids are caused to impinge upon the thermal motor, which in turn expands and contracts and controls the relative proportions of hot and cold fluids passing through the valve. Consequently, when there is an undesirable rise in the temperature of the mixed fluid the thermal motor expands to cause the valve member to reduce the hot flow via the hot inlet port and increase the cold flow via the cold inlet port. Expansion of the thermal motor, therefore, restores the fluid supply temperature condition to that desired, with a converse operation when there is contraction of the thermal motor due to a fall in the mixed fluid temperature.

Prior art TMVs that can be used with emergency drench shower stations and eyewash stations are shown in U.S. Pat. Nos. 5,011,074; 5,379,936; 5,647,531; 6,575,377; and 6,732,937. These prior art TMV's allow a cold-water bypass upon failure of the hot water supply so that emergency drench shower stations and eyewash stations remain supplied with water even upon failure of the hot water supply.

What is still desired is a new and improved TMV that can be used to mix hot and cold water supplies to produce tempered water for emergency drench shower stations and eyewash stations. Preferably the thermostatic mixing valve will be adapted to allow a cold-water bypass upon failure of the hot water supply so that emergency drench shower stations and eyewash stations remain supplied with water even upon failure of the hot water supply.

SUMMARY OF THE DISCLOSURE

The present disclosure provides a new and improved thermostatic mixing valve (TMV) adapted to allow a cold-water bypass upon failure of a hot water supply. According to one exemplary embodiment, the TMV includes a housing having a hot water inlet, a cold water inlet, and a mixed water outlet. A hot water valve seat is positioned in the housing adjacent the hot water inlet, a cold water valve seat is positioned in the housing adjacent the cold water inlet, and a mixing chamber is defined in the housing between the cold water inlet and the hot water inlet. A plunger is received in the mixing chamber and adapted to be moved along a longitudinal axis of the housing between the cold water valve seat and the hot water valve seat. The plunger and the hot water valve seat define a hot water valve opening controlling flow from the hot water inlet to the mixing chamber, and the plunger and the cold water valve seat define a cold water valve opening controlling flow from the cold water inlet to the mixing chamber.

The TMV also includes a sensing chamber defined in the housing and connected to the mixed water outlet, and a flow directing assembly positioned in the housing between the mixing chamber and the sensing chamber. A thermal motor is located at least partially within the sensing chamber and extends through the flow directing assembly to the plunger, whereby expansion of the thermal motor causes movement of the plunger towards the hot water valve seat. A plunger return spring biases the plunger toward the cold water valve seat.

The flow directing assembly includes an insert defining at least one mixed fluid passageway extending between the mixing chamber and the sensing chamber, and a funnel extending from a first end of the insert into the mixing chamber. The funnel includes a distal end forming the cold water valve seat, and at least one cold water bypass passageway is defined between an outwardly facing surface of the funnel and an inwardly facing surface of the insert for connecting the cold water inlet to the sensing chamber. The cold water bypass passageway is positioned such that cold water can bypass the cold water valve opening and flow from the cold water inlet to the sensing chamber. The TMV also includes a check valve adapted to normally close the cold water bypass passageway and only allow flow through the bypass passageway and into the sensing chamber upon fluid pressure within the sensing chamber dropping below the pressure in the cold water inlet.

Among other aspects and advantages, the new and improved TMV of the present disclosure allows a cold-water bypass upon failure of the hot water supply so that emergency drench shower stations and eyewash stations remain supplied with water even upon failure of the hot water supply.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein:

FIG. 7 is an enlarged, exploded top and side perspective view of some of the internal components of the TMV of FIG. 1, including a cold water bypass poppet, an insert, and a funnel;

FIG. 8 is a further enlarged top perspective view of the cold water bypass poppet;

DETAILED DESCRIPTION OF EXEMPLARY EMBODIMENTS

Figure 1:
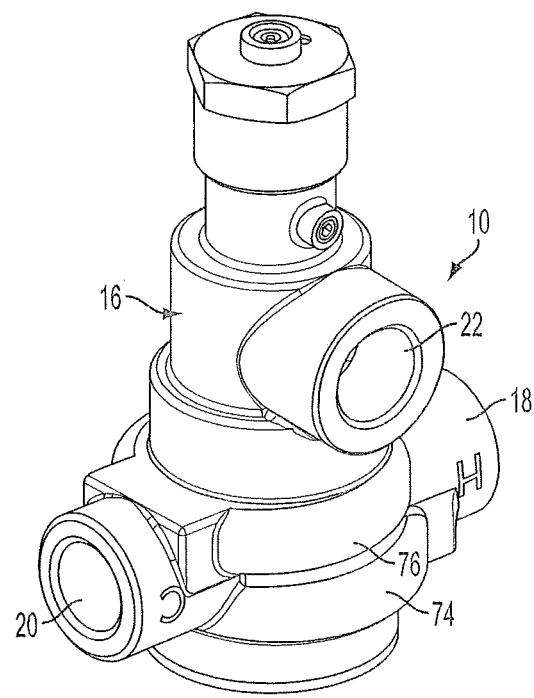
FIG. 1 is a top and side perspective view of an exemplary embodiment of a thermostatic mixing valve (TMV) constructed in accordance with the present disclosure.
Figure 2:
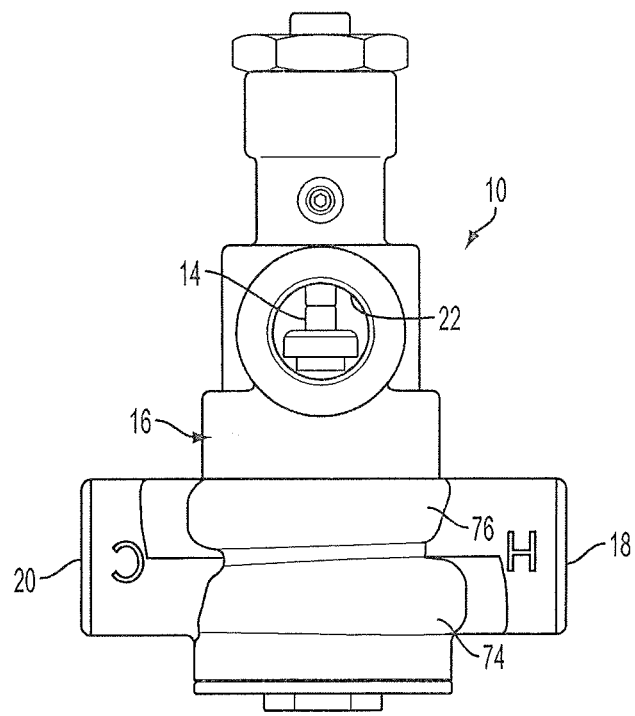
FIG. 2 is a side elevation view of the TMV of FIG. 1.

Referring to FIGS. 1-12, an exemplary embodiment of a new and improved thermostatic mixing valve (TMV) 10 according to the present disclosure is shown. Among other benefits, the new and improved TMV 10 of the present disclosure allows a cold-water bypass upon failure of a hot water supply so that emergency drench shower stations and eyewash stations connected to the TMV remain supplied with water even upon failure of the hot water supply. Without the bypass no water will pass through the TMV since the lack of hot water cause the cold water valve member to be closed.

The TMV 10 includes a housing 16 having a first inlet 18 for receiving a first fluid and a second inlet 20 for receiving a second fluid, and an outlet 22 for discharging a mixture of the first and the second fluids. In the exemplary embodiment shown, the first inlet 18 is designed to receive hot water, the second inlet 20 is designed to receive cold water, and tempered water is discharged from the outlet 22.

As shown best in FIGS. 4-6 and 10, first and second spaced-apart seats 24, 26 are received in the housing 16 and define a mixing chamber 28 between the first and the second inlets 18, 20. In the exemplary embodiment shown, the first seat comprises a hot water seat 24 positioned adjacent the hot water inlet 18, while the second seat comprises a cold water seat 26 positioned adjacent the cold water inlet 20. The cold water seat 26 is located on an end 102 of a flow directing assembly 100 that separates the mixing chamber 28 from a sensing chamber 12 of the housing 16. The sensing chamber 12 is connected to the outlet 22 of the housing 16.

The TMV 10 also includes a plunger 36 received in the mixing chamber 28 that is movably between the first and the second seats 24, 26. The plunger 36 and the first seat 24 define a first valve opening 38 (i.e., hot water valve opening) that controls flow from the first inlet 18 to the mixing chamber 28, and the plunger 36 and the second seat 26 define a second valve opening 40 (i.e., cold water valve opening) that controls flow from the second inlet 20 to the mixing chamber 28. A spring 42 biases the plunger 36 away from the first seat 24 to open the first valve opening 38 and close the second valve 40 opening (i.e., more hot water and less cold water).

A thermostat element, or thermal motor 14, is at least partially located within the sensing chamber 12 and extends through the flow directing assembly 100 to the plunger 36. The thermal motor 14 includes a temperature responsive (expandable) piston 44 that extends from a cylinder 46 connected by a flange 48 to a casing 50. In general, the casing 50 contains a thermally expandable wax material, which pushes against the piston 44 to increase the overall length of the thermal motor 14 as a temperature of the wax increases. Expansion of the thermal motor 14, therefore, causes movement of the plunger 36 against the spring 42 and towards the first seat 24, such that the first valve opening 38 is closed and the second valve opening 40 is opened (i.e., less hot water and more cold water). The thermal motor 14, therefore, controls the temperature of the mixed fluid.

Figure 3:
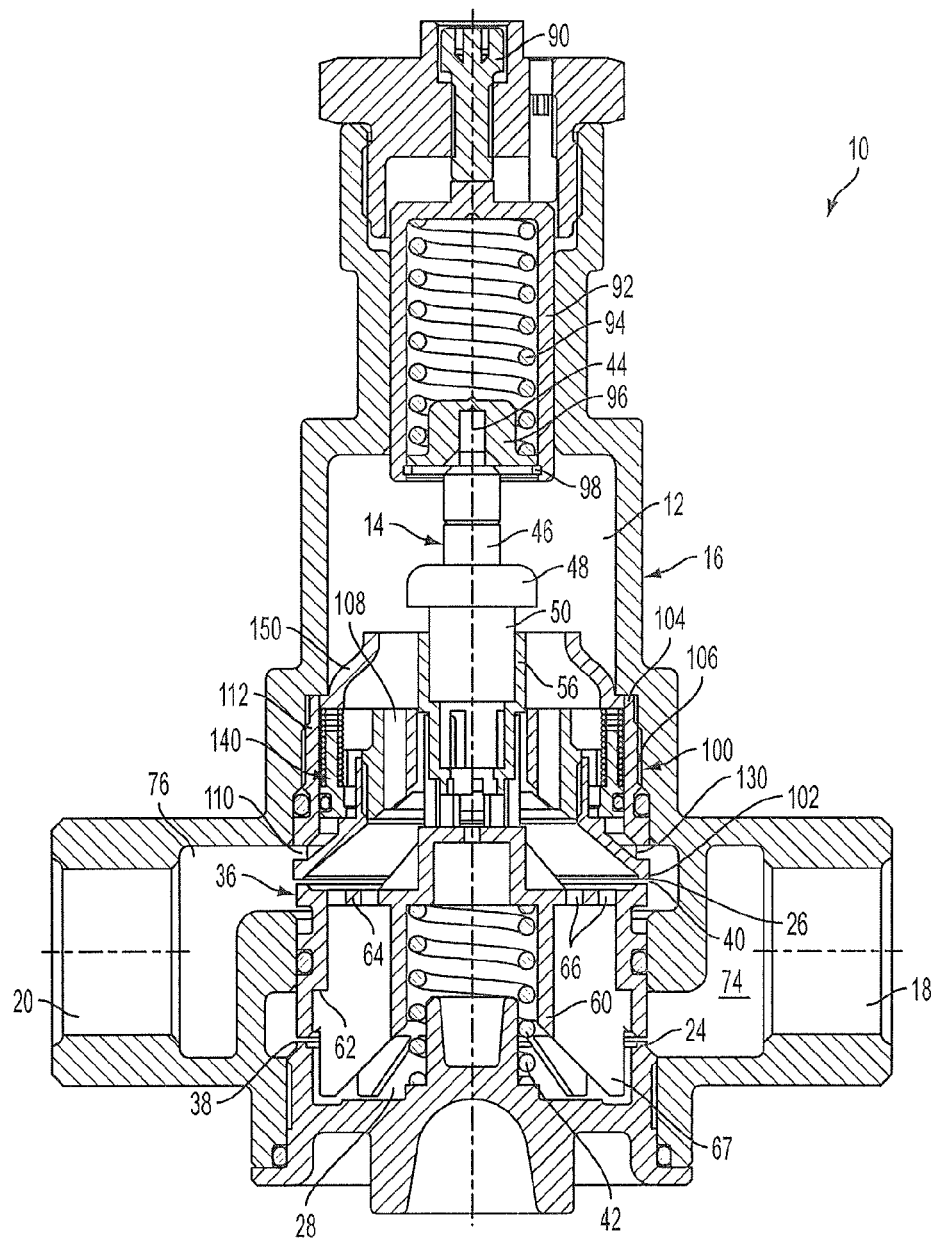
FIG. 3 is a sectional view of the TMV of FIG. 1.
Figure 4:
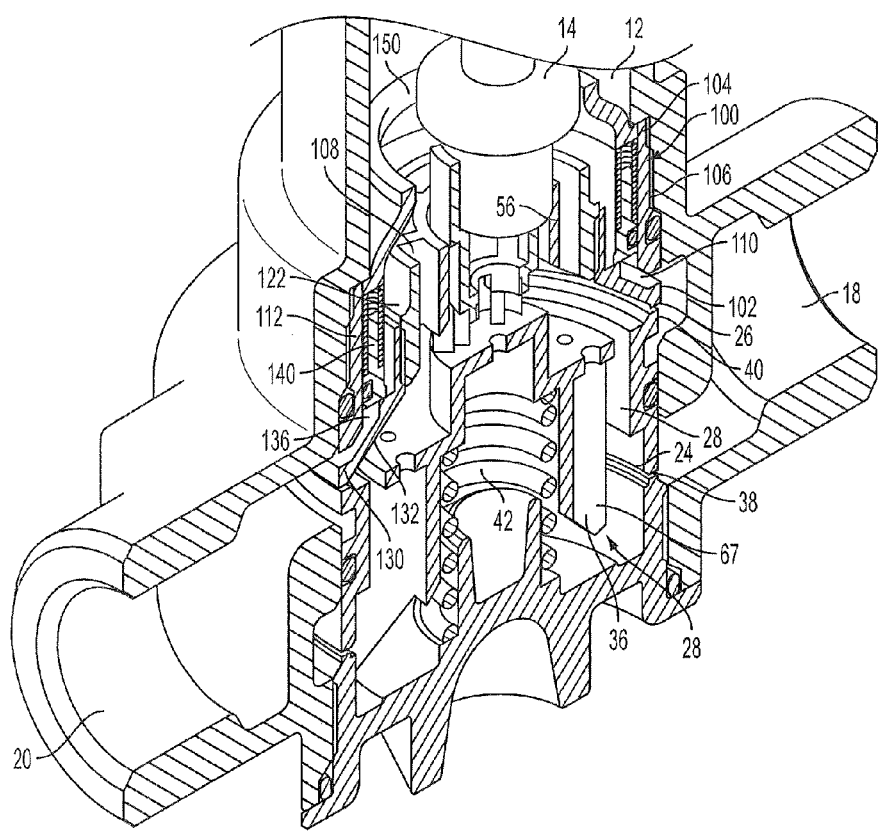
FIG. 4 is an enlarged sectional view, in perspective, of a portion of the TMV of FIG. 1.
Figure 5:
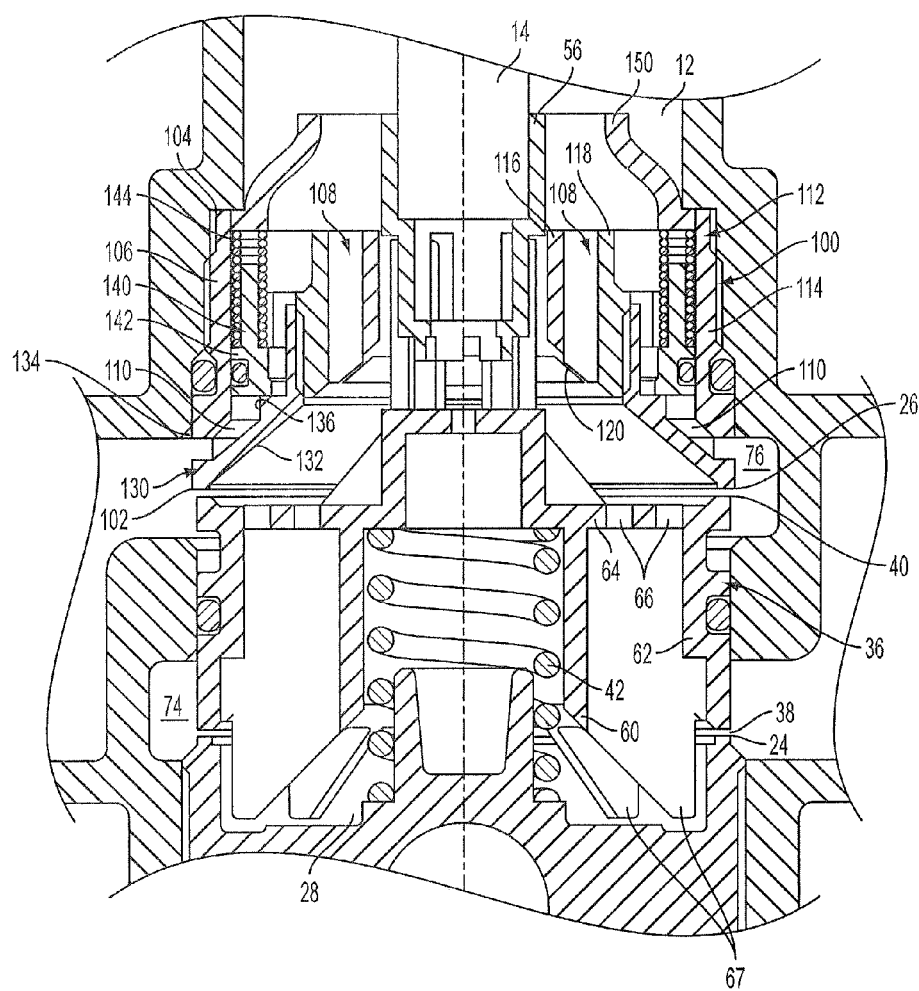
FIG. 5 is a further enlarged sectional view of a portion of the TMV of FIG. 1.
Figure 6:
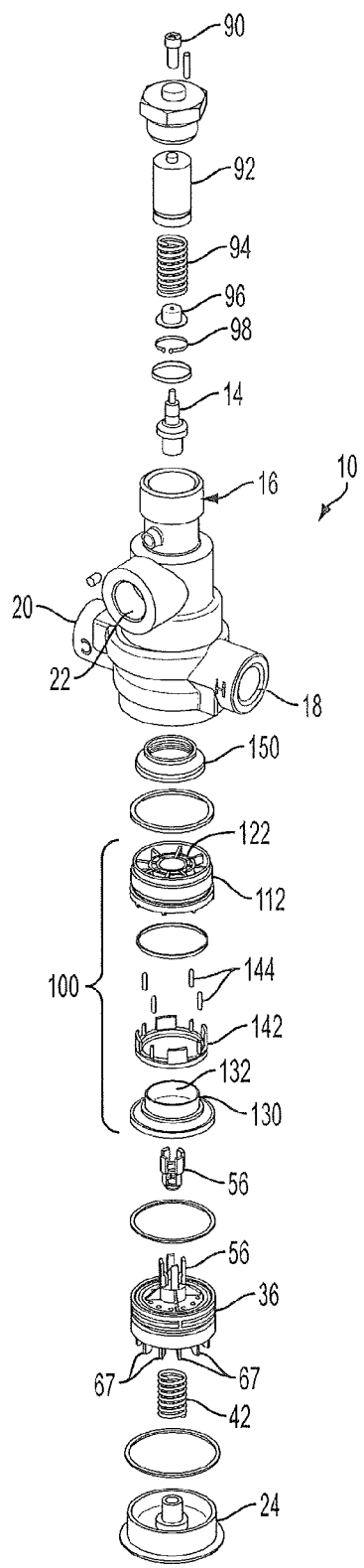
FIG. 6 is an exploded top and side perspective view of the TMV of FIG. 1.

As shown best in FIGS. 3-5, the flow directing assembly 100 includes a first end 102 received in the mixing chamber 28 and extending past the cold water inlet 20, a second end 104 received in the sensing chamber 12, a sidewall 106 extending between the first and the second ends 102, 104, a mixed water passageway 108 extending between the first and the second ends 102, 104 to provide fluid communication between the mixed chamber 28 and the sensing chamber 12, and a cold water bypass passageway 110 extending from the sidewall 106 adjacent the first end 102 for providing fluid communication between the cold water inlet 20 and the sensing chamber 12.

Figure 9:
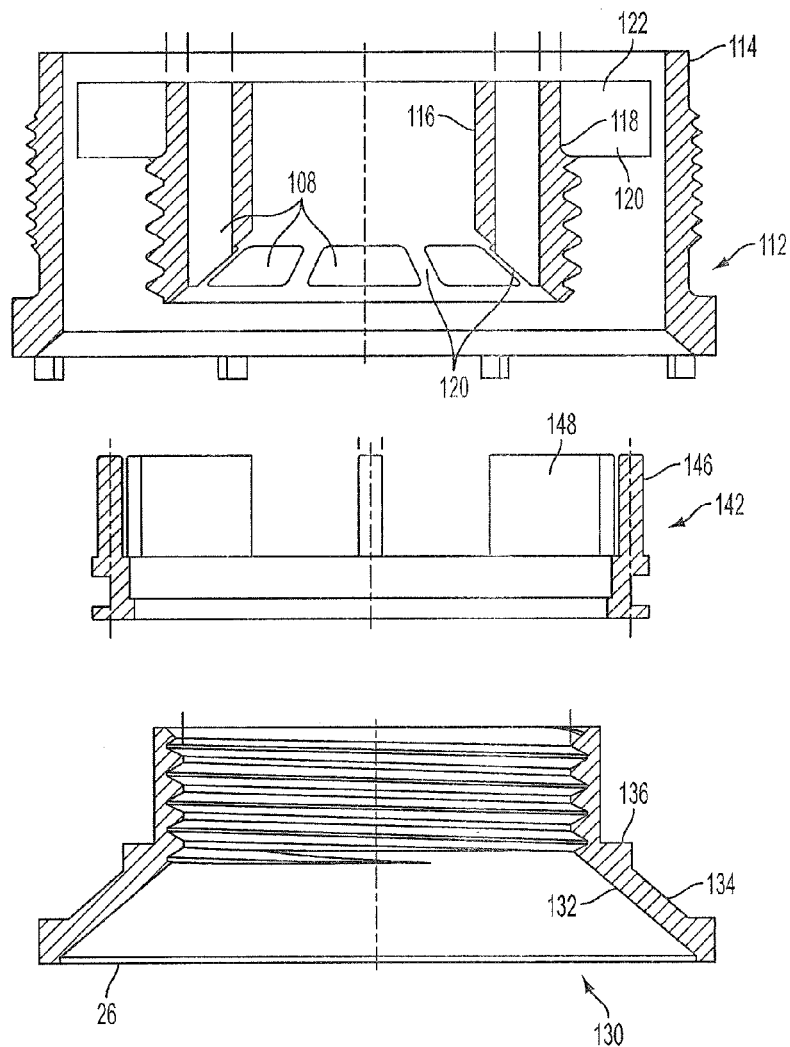
FIG. 9 is a further enlarged sectional view of the cold water bypass poppet, the insert, and the funnel.

In the exemplary embodiment shown, the flow directing assembly 100 includes a cylindrical insert 112 extending from the sensing chamber 12 and including a tubular outer wall 114, a tubular inner wall 116, and a tubular intermediate wall 118, wherein the mixed fluid passageway 108 is defined between the inner wall 116 and the intermediate wall 118 and within the inner wall 116 (i.e., between the inner wall 116 and the thermal motor 14). The tubular walls 114, 116, 118 are connected by radial ribs 120, as shown best in FIGS. 7 and 9. The flow directing assembly 100 also includes a funnel 130 extending from the intermediate wall 118 of the insert 112 and into the mixing chamber 28, and the cold water bypass passageway 110 is defined between an outwardly facing surface 134 of the funnel 130 and the outer wall 114 of the insert 112, as shown best in FIGS. 3-5. The insert 112 includes ports 122 between the outer wall 114 and the intermediate wall 118 that connect the bypass passageway 110 directly to the sensing chamber 12. An inwardly facing surface 132 of the funnel 130 is adapted to direct fluid from the mixing chamber 28 to the mixed water passageway 108 of the insert 112. The funnel 130 is also shown in FIGS. 7 and 9.

In the exemplary embodiment shown, the outer wall 114 of the insert 112 is secured to the housing 16 with screw threads, and the funnel 130 is secured to the intermediate wall 118 of the insert 112 with screw threads. In an alternative embodiment, the insert 112 and the funnel 130 could be attached together in other ways, such as by welding, or could simply be formed together as a single unitary piece. In addition, the insert 112 could be secured to the wall of the housing 16 in other ways, such as by welding, or could simply be formed together as a single unitary piece with the housing.

The TMV 10 also includes a check valve 140 adapted to normally close the bypass passageway 110 of the flow directing assembly 100. The check valve 140 is adapted to open and allow flow directly from the cold water inlet 20, through the bypass passageway 110, to the sensing chamber 12 in response to a predetermined increase in pressure drop between the cold water inlet 20 and the sensing chamber 12. The check valve 140 can be of any type sensitive to pressure. In the exemplary embodiment shown, the funnel 130 includes a bypass valve seat 136 on the outwardly facing surface 134 and the check valve 140 includes a poppet 142 and a spring 144, the spring 144 being positioned to bias the poppet 142 against the bypass valve seat 136 to close the bypass passageway 110, as shown best in FIGS. 3-5.

As shown best in FIGS. 3-7, the flow directing assembly 100 also includes a flow-directing element 150 extending from the insert 112 into the sensing chamber 12 that directs fluid flow from the mixing fluid passageway 108 towards the thermal motor 14. In the exemplary embodiment shown the flow-directing element 150 is secured between a shoulder of the housing 16 and the insert 112, and the spring 144 of the check valve 140 extends between the flow directing element 150 and the poppet 142. In the exemplary embodiment shown, the poppet 142 is annular, coaxial with the longitudinal axis of the housing 16, and coaxially aligned between the funnel 130 and the insert 112. The check valve 140 includes multiple springs 144 received on prongs 146 of the annular poppet 142, as shown best in FIGS. 6 and 7. As shown in FIGS. 8 and 9, the annular poppet 112 also includes extensions 148 located between the prongs 146 which help to maintain the poppet 112 correctly positioned within the outer wall 114 of the insert 112.

The plunger 36, best shown in FIGS. 3-7, includes a socket 56 extending along the longitudinal axis of the housing within the inner wall of the insert. The socket 56 has openings for allowing flow through the insert, and the thermal motor 14 is received in the socket 56. The casing 50 of the thermal motor 14 is partially received in the socket 56 of the plunger 36, and at least a portion of the casing 50 of the thermal motor 14 is received in the sensing chamber 12.

The plunger 36 also includes coaxial inner and outer tubular walls 60, 62 connected by a lateral wall 64. Radial fins 67 are provided between the inner and outer walls 60, 62, and the lateral wall 64 includes apertures 66 for allowing the mixture of fluid flow from the hot and the cold valve openings 38, 40. A bottom edge of the outer wall 62 forms the hot water valve opening 38 in combination with the hot water seat 24, and a top edge of the outer wall 62 fauns the cold water valve opening 40 in combination with the cold water seat 26.

Although not required, in the exemplary embodiment shown the housing 16 further comprises an annular first inlet chamber 74 connected to the first inlet 18 and surrounding the first valve sea 24, an annular second inlet chamber 76 connected to the second inlet 20 and surrounding the second valve seat 26. These chambers are shown in FIGS. 1-5 of the drawings.

Although not required, in the exemplary embodiment shown the TMV 10 also includes an adjustable motor positioning assembly including a setscrew 90, a case 92, a spring 94, a cap 96, and a retainer ring 98. The TMV 10 further includes numerous o-rings providing fluid-tight seals between the assembled parts of the TMV. For example, an o-ring is provided between the annular poppet 112 and the outer wall 114 of the insert 112, and an o-ring is provided between the outer wall 114 of the insert 112 and the housing 16. An o-ring is also provided between the plunger 36 and the housing 16 to create a seal between the inlets 18, 20. as shown best in FIG. 3-5.

Figure 10:
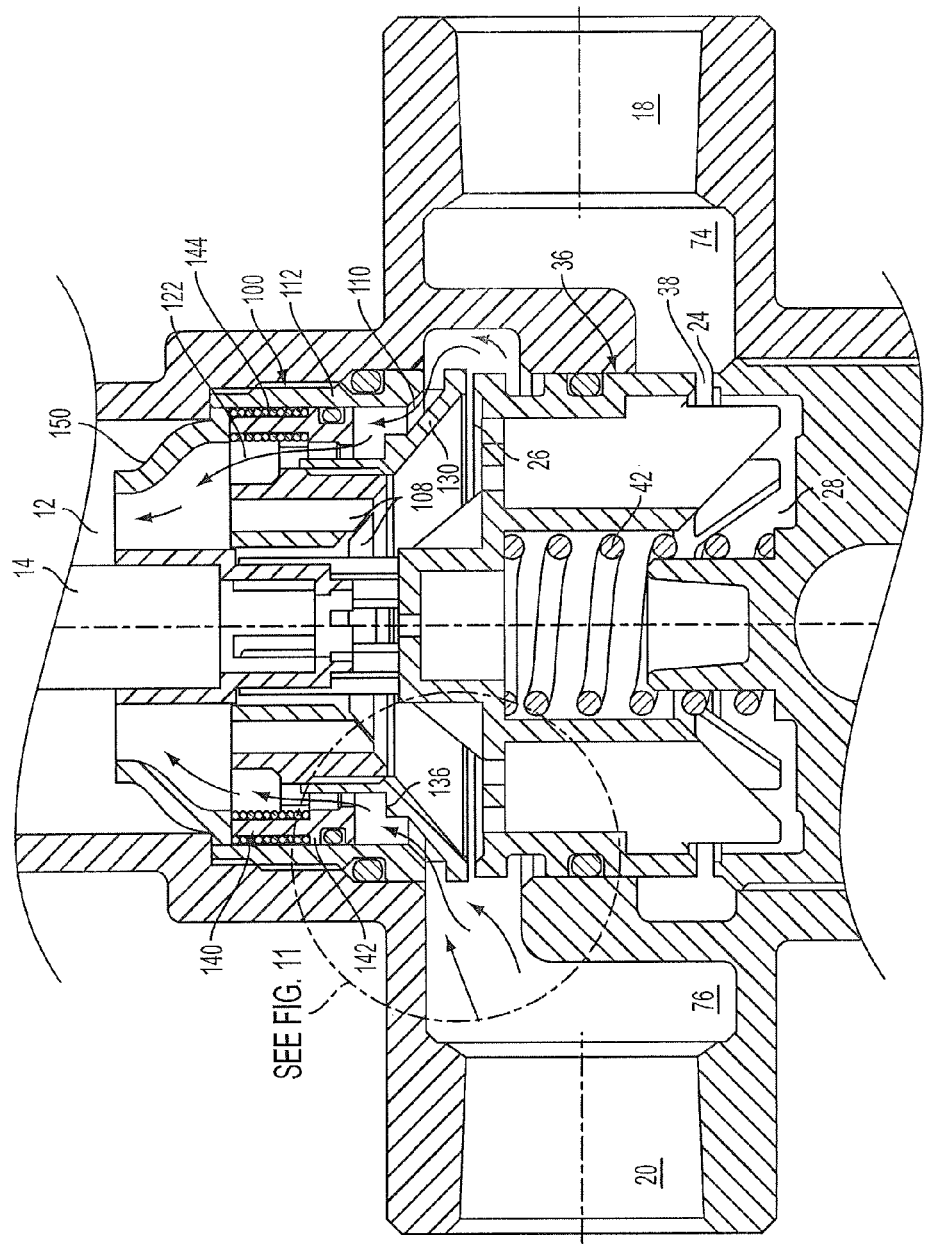
FIG. 10 is an enlarged sectional view of a portion of the TMV of FIG. 1, wherein hot water failure conditions are illustrated and the cold water bypass poppet is shown in an open position.
Figure 11:
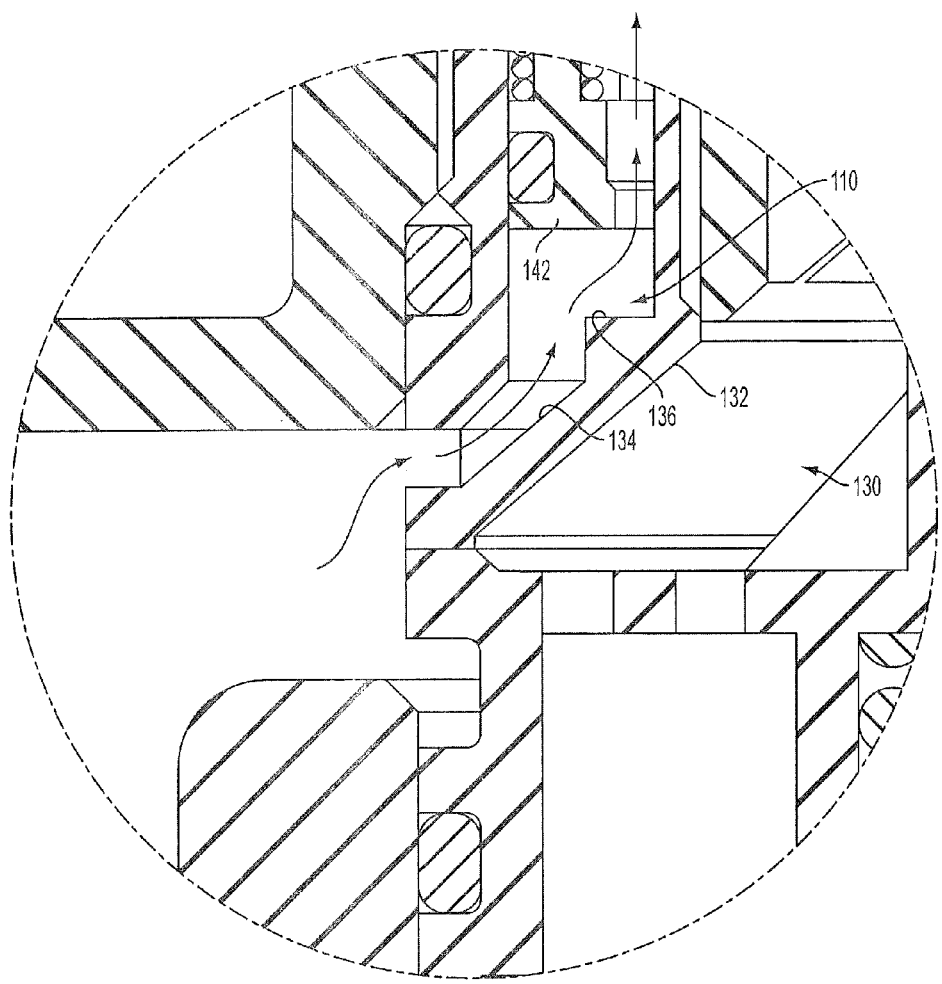
FIG. 11 is a further enlarged sectional view of a portion of the TMV contained within circle "11" of FIG. 10, wherein the cold water bypass poppet is shown in an open position.
Figure 12:
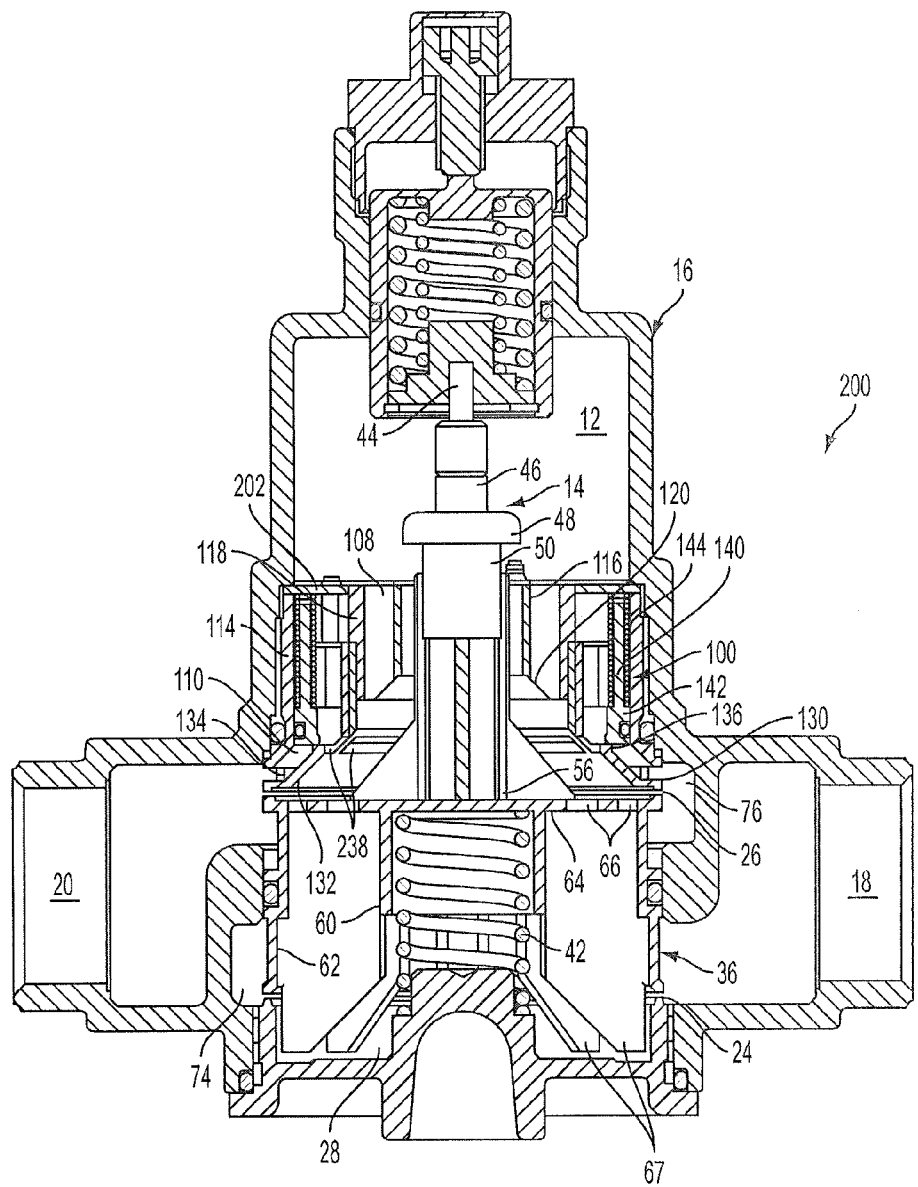
FIG. 12 is a sectional view of another exemplary embodiment of a TMV constructed in accordance with the present disclosure.
Figure 13:
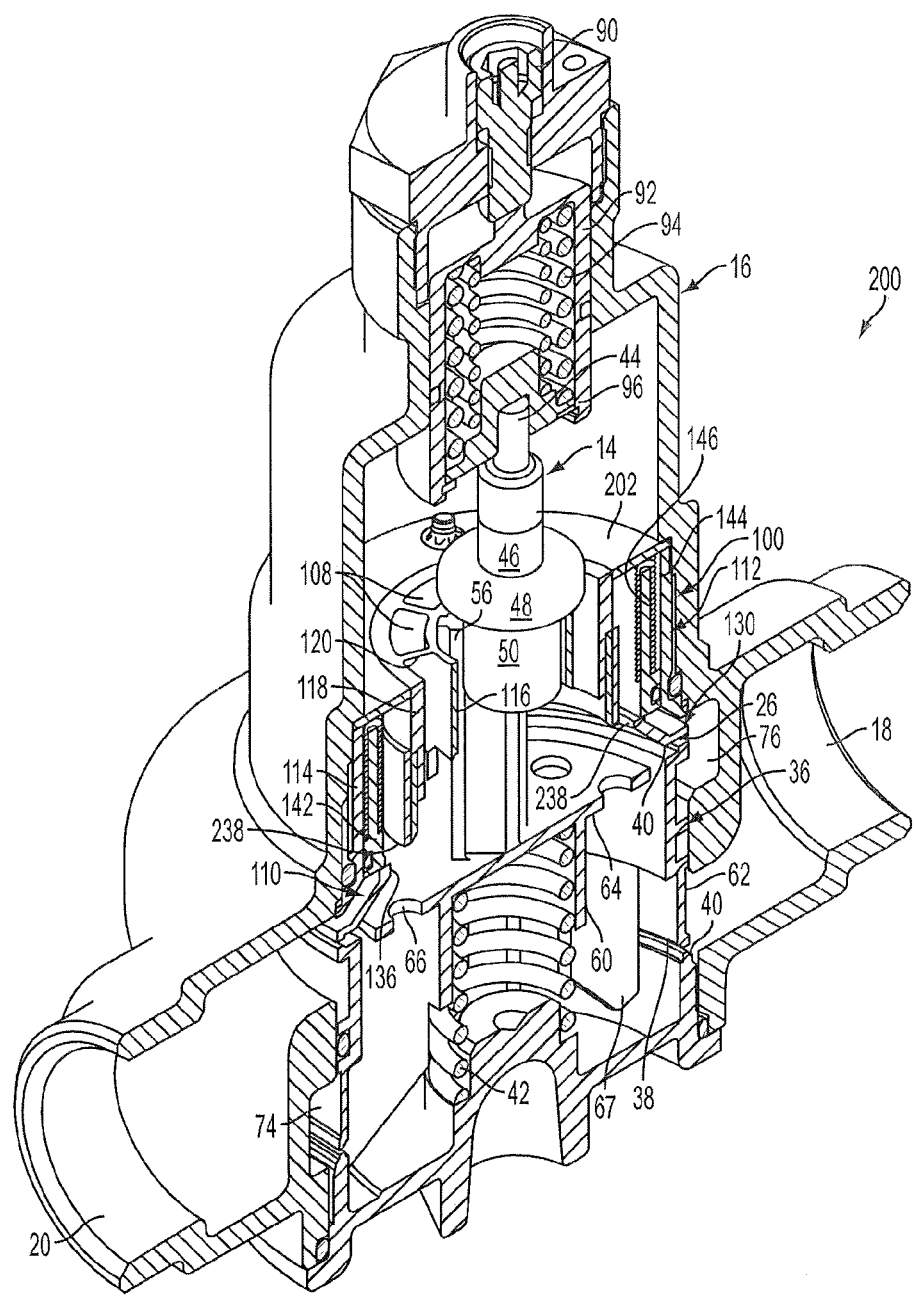
FIG. 13 is a sectional view, in perspective, of the TMV of FIG. 12.

In FIGS. 10 and 11 a hot water failure condition is illustrated and the cold water bypass poppet 142 is shown in an open position During a hot water failure, the thermal motor 14 cools and shrinks such that the cold water valve opening 40 closes completely. No water is then delivered to the sensing chamber such that pressure within the sensing chamber 12 drops below pressure at the cold water inlet 20. The pressure differential between the cold water inlet 20 and the sensing chamber 12 then forces the poppet 142 towards the sensing chamber 12 and off of the bypass valve seat 136 of the funnel 130, so that the bypass passageway 110 is opened. Arrows labeled "Bypass Flow" illustrate the flow of water from the cold water inlet 20, through the bypass passageway 110, to the sensing chamber 12.

Figure 14:
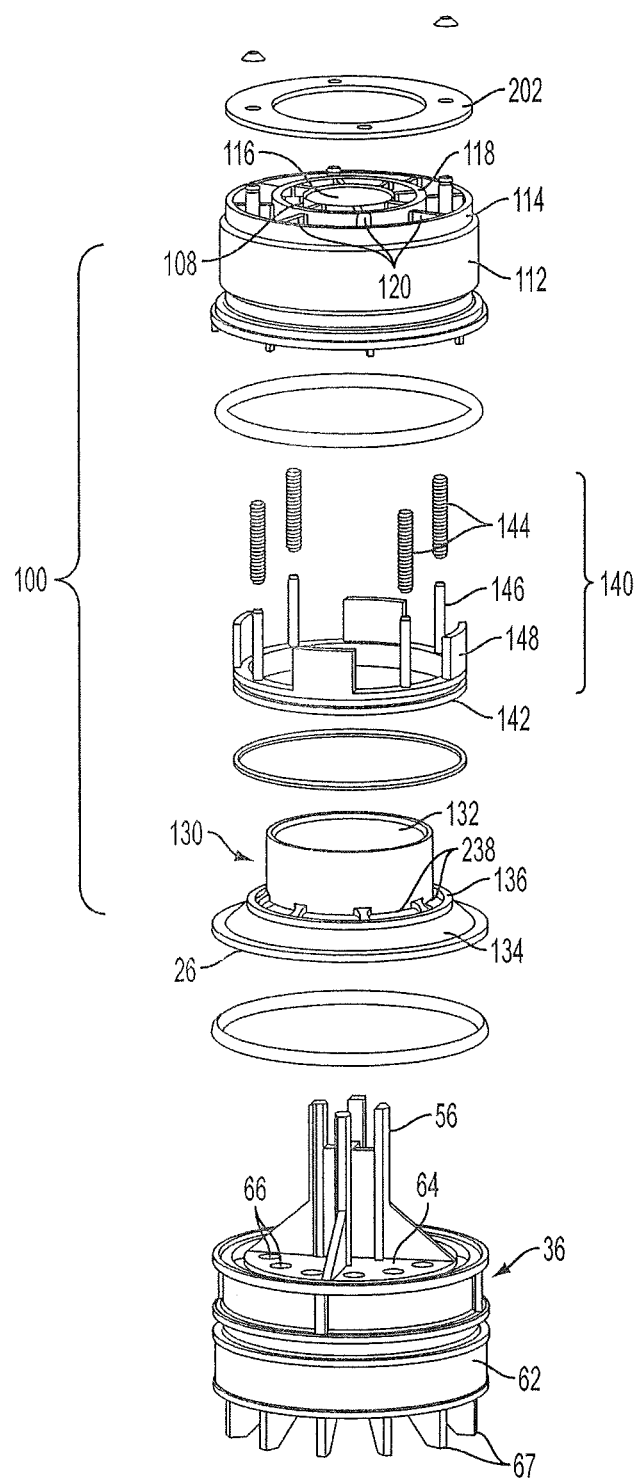
FIG. 14 is an enlarged, exploded top and side perspective view of some of the internal components of the TMV of FIG. 12, including a cold water bypass poppet.
Figure 15:
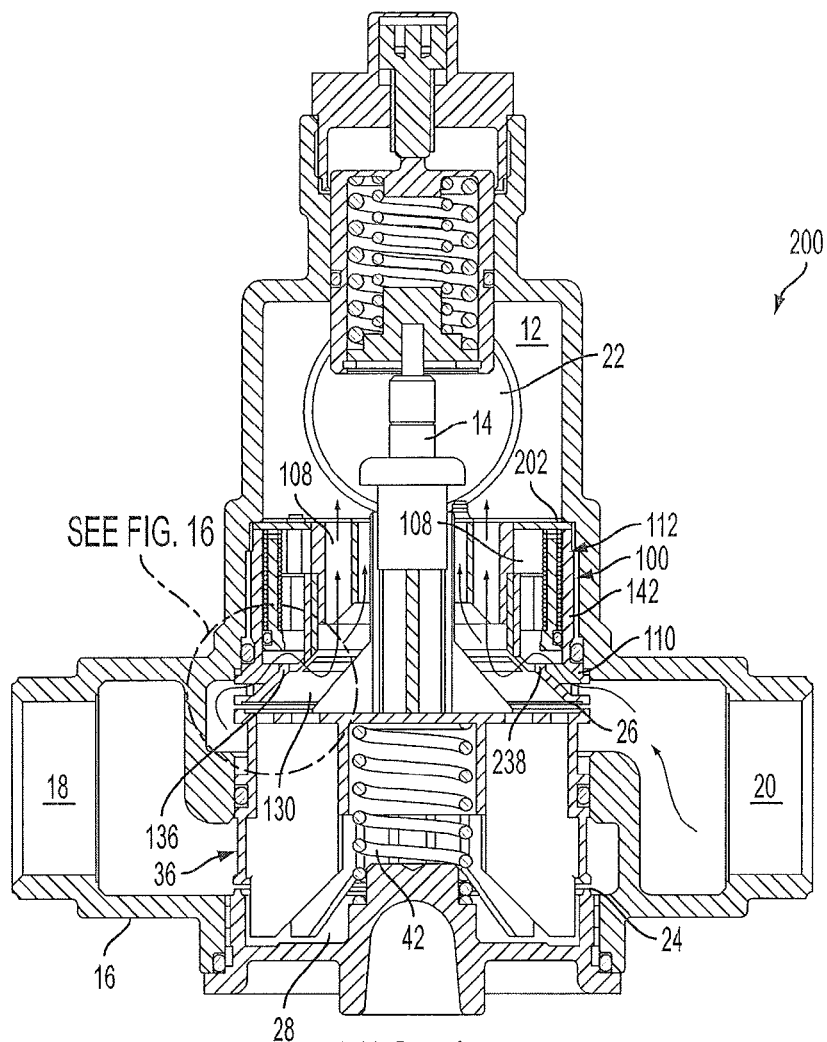
FIG. 15 is a sectional view of the TMV of FIG. 12, wherein hot water failure conditions are illustrated and the cold water bypass poppet is shown in an open position.
Figure 16:
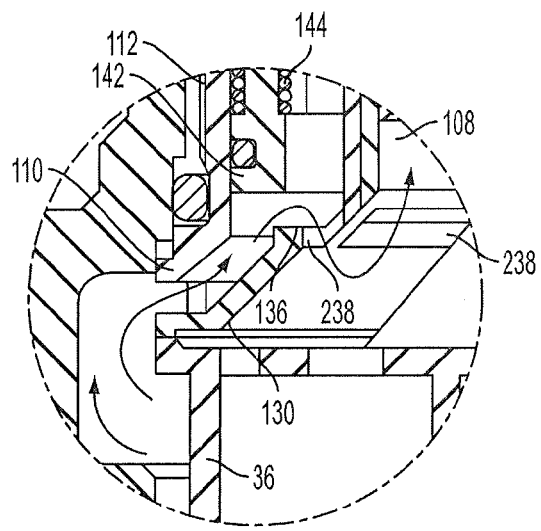
FIG. 16 is a further enlarged sectional view of a portion of the TMV contained within circle "16" of FIG. 15, wherein the cold water bypass poppet is shown in an open position.

FIGS. 12-15 show another exemplary embodiment of a TMV 200 according to the present disclosure. The TMV 200 is similar to the TMV 10 of FIGS. 1-11 such that similar elements have the same reference numerals. The TMV 200 of FIGS. 10-15, however, does not include the flow-directing element 150 extending from the second end 104 of the flow directing assembly 100. Instead, an annular plate 202 is secured to a second end 104 of the assembly 100, closing the ports 122 located between the outer wall 114 and the intermediate wall 118, and the funnel 130 includes ports 238 beyond the bypass valve seat 136 connecting the bypass passageway 110 to the mixed flow passageway 108. In FIGS. 14 and 15, arrows labeled "Bypass Flow" illustrate the flow of cold water through the ports 238 during a hot water failure condition.

The present disclosure, therefore, provides a new and improved thermostatic mixing valve. It should be understood, however, that the exemplary embodiment described in this specification has been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the mixing valve disclosed herein, and all elements thereof, are contained within the scope of at least one of the following claims. No elements of the presently disclosed thermostatic mixing valve are meant to be disclaimed.

What is claimed is:

1. A thermostatic mixing valve comprising:
   a housing having a hot water inlet, a cold water inlet, and a mixed water outlet;
   a hot water valve seat positioned in the housing adjacent the hot water inlet;
   a cold water valve seat positioned in the housing adjacent the cold water inlet;
   a mixing chamber defined in the housing between the cold water inlet and the hot water inlet;
   a plunger received in the mixing chamber and adapted to be moved along a longitudinal axis of the housing between the cold water valve seat and the hot water valve seat, wherein the plunger and the hot water valve seat define a hot water valve opening controlling flow from the hot water inlet to the mixing chamber, and the plunger and the cold water valve seat define a cold water valve opening controlling flow from the cold water inlet to the mixing chamber;
   a sensing chamber defined in the housing and connected to the mixed water outlet;
   an insert positioned in the housing between the mixing chamber and the sensing chamber and defining at least one mixed fluid passageway extending between the mixing chamber and the sensing chamber;
   a thermal motor located at least partially within the sensing chamber and extending through the insert to the plunger, whereby expansion of the thermal motor causes movement of the plunger towards the hot water valve seat;

a plunger return spring biasing the plunger toward the cold water valve seat;

a funnel extending from a first end of the insert into the mixing chamber and including a distal end forming the cold water valve seat;

at least one cold water bypass passageway defined between an outwardly facing surface of the funnel and an inwardly facing surface of the insert for connecting the cold water inlet to the sensing chamber, the cold water bypass passageway positioned such that cold water can bypass the cold water valve opening and flow from the cold water inlet to the sensing chamber; and a check valve adapted to normally close the cold water bypass passageway and only allow flow through the bypass passageway and into the sensing chamber upon fluid pressure within the sensing chamber dropping below pressure in the cold water inlet, wherein the insert includes a tubular outer wall, a tubular inner wall, and a tubular intermediate wall, wherein the walls of the insert are coaxial with the longitudinal axis of the housing, the mixing water passageway is defined between the inner wall and the intermediate wall, and the cold water bypass passageway is disposed between the intermediate wall and the outer wall.

2. A valve according to claim 1, wherein the funnel includes a bypass valve seat on the outwardly facing surface of the funnel and the check valve comprises a poppet and a spring biasing the poppet against the bypass valve seat to close the bypass passageway.

3. A valve according to claim 2, wherein the funnel includes ports downstream from the bypass valve seat connecting the bypass passageway to the mixed water passageway of the insert.

4. A valve according to claim 2, wherein the poppet is annular, coaxial with the longitudinal axis of the housing, and coaxially aligned between the funnel and the insert.

5. A valve according to claim 4, further comprising a flow-directing element extending from a second end of the insert into the sensing chamber that directs fluid flow from the mixed water passageway to the thermal motor.

6. A valve according to claim 5, wherein springs of the check valve are positioned between the flow directing element and the poppet.

7. A valve according to claim 6, wherein the second end of the insert includes ports connected to the bypass passageway.

8. A valve according to claim 1, wherein an inner surface of the funnel is adapted to direct fluid from the mixing chamber to the mixed water passageway of the insert.

9. A valve according to claim 1, wherein the outer wall of the insert is secured to the housing with screw threads.

10. A valve according to claim 1, wherein the funnel is secured to the intermediate wall of the insert with screw threads.

11. A valve according to claim 1, wherein the plunger includes a socket extending along the longitudinal axis of the housing within the inner wall of the insert, and the thermal motor is received in the socket.

12. A valve according to claim 1, wherein the insert includes ports between the outer wall and the intermediate wall that connect the bypass passageway directly to the sensing chamber.

13. A valve according to claim 1, further comprising:

an annular plate secured to a second end of the insert closing ports located between the outer wall and the intermediate wall;

a bypass valve seat on the outwardly facing surface of the funnel;

the check valve comprises a poppet and a spring biasing the poppet against the bypass valve seat to close the bypass passageway; and the spring is positioned between the annular plate and the poppet.

14. A valve according to claim 1, wherein the funnel includes ports connecting the bypass passageway to the mixed water passageway of the insert.

* * * * *